(12) United States Patent
Givon et al.

(10) Patent No.: US 8,878,779 B2
(45) Date of Patent: Nov. 4, 2014

(54) METHODS CIRCUITS DEVICE SYSTEMS AND ASSOCIATED COMPUTER EXECUTABLE CODE FOR FACILITATING INTERFACING WITH A COMPUTING PLATFORM DISPLAY SCREEN

(75) Inventors: Dor Givon, Tel Aviv (IL); Ilya Kottel, Bat-Yam (IL)

(73) Assignee: Extreme Reality Ltd., Herzliya (IL)

( * ) Notice: Subject to any disclaimer, the term of this patent is extended or adjusted under 35 U.S.C. 154(b) by 110 days.

(21) Appl. No.: 13/468,282

(22) Filed: May 10, 2012

(65) Prior Publication Data

US 2012/0218183 A1 Aug. 30, 2012

Related U.S. Application Data

(63) Continuation-in-part of application No. 13/497,061, filed as application No. PCT/IL2010/000791 on Sep. 21, 2010.

(60) Provisional application No. 61/624,372, filed on Apr. 15, 2012, provisional application No. 61/244,136, filed on Sep. 21, 2009.

(51) Int. Cl.
*G09G 5/00* (2006.01)
*G06F 3/01* (2006.01)

(52) U.S. Cl.
CPC ..................................... *G06F 3/017* (2013.01)
USPC ........... 345/156; 345/157; 715/851; 715/856; 715/863

(58) Field of Classification Search
USPC .......... 345/156, 157, 173; 715/705, 708, 711, 715/715, 851, 856–863
See application file for complete search history.

(56) References Cited

U.S. PATENT DOCUMENTS

| 4,376,950 | A | 3/1983 | Brown et al. |
| 5,130,794 | A | 7/1992 | Ritchey |
| 5,515,183 | A | 5/1996 | Hashimoto |
| 5,691,885 | A | 11/1997 | Ward et al. |

(Continued)

FOREIGN PATENT DOCUMENTS

| EP | 1 115254 | 7/2001 |
| JP | 10-040418 | 2/1998 |

(Continued)

OTHER PUBLICATIONS

Carranza et al., "Free-Viewpoint Video of 1-39 Human Actors", Proc. of ACM Siggraph 2003, Jul. 27, 2003.

(Continued)

*Primary Examiner* — Jennifer Nguyen
(74) *Attorney, Agent, or Firm* — Vladimir Sherman; Professional Patent Solutions

(57) ABSTRACT

Disclosed are methods, circuits, apparatus, systems and computer executable code for providing a multimode touchless human machine interface (TLHMI). The TLHMI may include one or more touchless sensors to sense a position or a movement of a subject portion within a sensing zone of the one or more sensors. Tracking logic may receive an output of the one or more sensors and may track a position or movement of a portion of a computing platform user within the sensing zone. A user input generator may convert an output of the tracking logic into signals indicative of a user input and may provide the user input signals to a functionally associated computing platform.

18 Claims, 15 Drawing Sheets

(56) References Cited

U.S. PATENT DOCUMENTS

| | | | |
|---|---|---|---|
| 5,703,704 A | 12/1997 | Nakagawa et al. |
| 5,745,719 A | 4/1998 | Falcon |
| 5,831,633 A | 11/1998 | Van Roy |
| 5,835,133 A | 11/1998 | Moreton et al. |
| 5,852,450 A | 12/1998 | Thingvold |
| 5,909,218 A | 6/1999 | Naka et al. |
| 6,115,482 A | 9/2000 | Sears et al. |
| 6,243,106 B1 | 6/2001 | Rehg et al. |
| 6,303,924 B1 | 10/2001 | Adan et al. |
| 6,317,130 B1 | 11/2001 | Ishikawa et al. |
| 6,388,670 B2 | 5/2002 | Naka et al. |
| 6,529,643 B1 | 3/2003 | Loce et al. |
| 6,545,663 B1 | 4/2003 | Arbter et al. |
| 6,554,706 B2 | 4/2003 | Kim et al. |
| 6,597,801 B1 | 7/2003 | Cham et al. |
| 6,657,670 B1 | 12/2003 | Cheng |
| 6,674,877 B1 | 1/2004 | Jojic et al. |
| 6,681,031 B2 | 1/2004 | Cohen et al. |
| 6,833,843 B2 | 12/2004 | Mojaver et al. |
| 6,906,687 B2 | 6/2005 | Werner |
| 7,061,492 B2 | 6/2006 | Carrai et al. |
| 7,061,532 B2 | 6/2006 | Silverstein |
| 7,116,330 B2 | 10/2006 | Marshall et al. |
| 7,123,292 B1 | 10/2006 | Seeger et al. |
| 7,184,589 B2 | 2/2007 | Okubo |
| 7,257,237 B1 | 8/2007 | Luck et al. |
| 7,308,112 B2 | 12/2007 | Fujimura et al. |
| 7,366,278 B2 | 4/2008 | Fu et al. |
| 7,429,997 B2 | 9/2008 | Givon |
| 7,755,608 B2 | 7/2010 | Chang et al. |
| 7,783,118 B2 | 8/2010 | Zhou |
| 7,885,480 B2 | 2/2011 | Bryll et al. |
| 7,903,141 B1 | 3/2011 | Mariano et al. |
| 7,936,932 B2 | 5/2011 | Bashyam et al. |
| 7,978,917 B2 | 7/2011 | Lei et al. |
| 8,005,263 B2 | 8/2011 | Fujimura et al. |
| 8,036,494 B2 | 10/2011 | Chen |
| 8,094,873 B2 | 1/2012 | Kelusky et al. |
| 8,094,943 B2 | 1/2012 | Eaton et al. |
| 8,107,726 B2 | 1/2012 | Xu et al. |
| 8,111,284 B1 | 2/2012 | Givon |
| 8,114,172 B2 | 2/2012 | Givon |
| 8,219,936 B2 * | 7/2012 | Kim et al. ............ 715/862 |
| 8,237,775 B2 | 8/2012 | Givon |
| 8,432,390 B2 | 4/2013 | Givon |
| 8,462,199 B2 | 6/2013 | Givon |
| 2001/0007452 A1 | 7/2001 | Naka et al. |
| 2002/0057383 A1 * | 5/2002 | Iwamura ............ 348/734 |
| 2002/0191239 A1 | 12/2002 | Psaltis et al. |
| 2003/0007680 A1 | 1/2003 | Iijima et al. |
| 2004/0155962 A1 | 8/2004 | Marks |
| 2004/0161133 A1 | 8/2004 | Elazar et al. |
| 2004/0193413 A1 | 9/2004 | Wilson et al. |
| 2004/0228530 A1 | 11/2004 | Schwartz et al. |
| 2005/0023448 A1 | 2/2005 | Ogawara et al. |
| 2005/0041842 A1 | 2/2005 | Frakes et al. |
| 2005/0063596 A1 | 3/2005 | Yomdin et al. |
| 2005/0166163 A1 | 7/2005 | Chang et al. |
| 2005/0232514 A1 | 10/2005 | Chen |
| 2005/0259870 A1 | 11/2005 | Kondo et al. |
| 2005/0271279 A1 | 12/2005 | Fujimura et al. |
| 2006/0010400 A1 | 1/2006 | Dehlin et al. |
| 2006/0056679 A1 | 3/2006 | Redert et al. |
| 2006/0104480 A1 | 5/2006 | Fleisher |
| 2006/0164230 A1 | 7/2006 | DeWind et al. |
| 2006/0187305 A1 | 8/2006 | Trivedi et al. |
| 2006/0294509 A1 | 12/2006 | Mital et al. |
| 2007/0098250 A1 | 5/2007 | Molgaard et al. |
| 2007/0183633 A1 | 8/2007 | Hoffmann |
| 2007/0183663 A1 | 8/2007 | Wang et al. |
| 2007/0236475 A1 | 10/2007 | Wherry |
| 2007/0259717 A1 | 11/2007 | Mattice et al. |
| 2007/0285419 A1 | 12/2007 | Givon |
| 2007/0285554 A1 | 12/2007 | Givon |
| 2008/0007533 A1 | 1/2008 | Hotelling |
| 2008/0013793 A1 | 1/2008 | Hillis et al. |
| 2008/0030460 A1 | 2/2008 | Hildreth et al. |
| 2008/0036732 A1 | 2/2008 | Wilson et al. |
| 2008/0037829 A1 | 2/2008 | Givon |
| 2008/0037869 A1 | 2/2008 | Zhou |
| 2008/0101722 A1 | 5/2008 | Bryll et al. |
| 2008/0104547 A1 | 5/2008 | Morita et al. |
| 2008/0111710 A1 | 5/2008 | Boillot |
| 2008/0143975 A1 | 6/2008 | Dennard et al. |
| 2008/0148149 A1 | 6/2008 | Singh et al. |
| 2008/0181499 A1 | 7/2008 | Yang et al. |
| 2009/0058833 A1 | 3/2009 | Newton |
| 2009/0062696 A1 | 3/2009 | Nathan et al. |
| 2009/0080715 A1 | 3/2009 | Van Beek et al. |
| 2009/0116732 A1 | 5/2009 | Zhou et al. |
| 2009/0141987 A1 | 6/2009 | McGarry et al. |
| 2009/0183125 A1 * | 7/2009 | Magal et al. .......... 715/863 |
| 2010/0066735 A1 | 3/2010 | Givon |
| 2010/0111370 A1 | 5/2010 | Black et al. |
| 2010/0141802 A1 | 6/2010 | Knight et al. |
| 2010/0194862 A1 | 8/2010 | Givon |
| 2010/0208038 A1 | 8/2010 | Kutliroff et al. |
| 2010/0303290 A1 | 12/2010 | Mathe |
| 2010/0328351 A1 | 12/2010 | Tan |
| 2011/0052068 A1 | 3/2011 | Cobb et al. |
| 2011/0069152 A1 | 3/2011 | Wang et al. |
| 2011/0080496 A1 | 4/2011 | Givon |
| 2011/0129124 A1 | 6/2011 | Givon |
| 2011/0163948 A1 | 7/2011 | Givon et al. |
| 2011/0286673 A1 | 11/2011 | Givon et al. |
| 2011/0292036 A1 | 12/2011 | Sali et al. |
| 2012/0176414 A1 | 7/2012 | Givon |
| 2012/0176477 A1 | 7/2012 | Givon |
| 2012/0218183 A1 | 8/2012 | Givon et al. |
| 2013/0120319 A1 | 5/2013 | Givon |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |
| WO | WO 2006/011153 | 2/2006 |
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Cheung G K M et al.,"Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

Theobalt C et al.,: "Enhancing silhouette-based human motion capture with 3D motion fields", Computer Graphics and Applications, 2003. Proceedings. 11th Pacific Conference on Oct. 8-10, 2003, Piscataway, NJ, USA, IEEE, Oct. 8, 2003.

Bregler C et al: "Tracking people with twists and exponential maps", Computer Vision and Pattern Recognition, 1998. Proceedings. 1998

(56) References Cited

OTHER PUBLICATIONS

IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.
Sminchisescu et al. "Estimated Articulated Human Motion with Covariance Scaled Sampling". Published 2003.
Sappa et al. "Monocular 3D Human Body Reconstruction toward Depth Augmentation of Television Sequences". Published 2003.
Sminchisescu et al. "Human Pose Estimation from Silhouettes A Consistent Approach Using Distance Level Set". Published 2002.
Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 1, Jun. 18, 2003, pp. 69-76, XP010644883, DOI: 10.1109/CVPR.2003.1211339 ISBN: 978-0-7695-1900-5.
Ren NG, "Digital Light Field Photography", Jul. 2006, (available at www.lytro.com/rennig-thesis.pdf).
D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

* cited by examiner

METHODS CIRCUITS DEVICE SYSTEMS AND ASSOCIATED COMPUTER EXECUTABLE CODE FOR FACILITATING INTERFACING WITH A COMPUTING PLATFORM DISPLAY SCREEN

FIELD OF THE INVENTION

The present invention generally relates to the field of electronics. More specifically, the present invention relates to methods, circuits, apparatus and systems for facilitating human interfacing with electronic devices such as personal computers, set-top boxes, smart televisions, general purpose computing platforms, mobile devices, cell phones, Personal Digital Assistants ("PDA"), digital cameras, or any integrated combination of electronic devices.

RELATED APPLICATIONS

The present application claims priority from U.S. patent application Ser. No. 13/497,061, which is hereby incorporated by reference in its entirety.

BACKGROUND

In recent decades, electronic technology, including communication technology, has revolutionized our everyday lives. Electronic devices such as PDA's, cell phones, e-books, notebook computers, mobile media players and digital cameras have permeated the lives of almost every person living in the developed world—and quite a number of people living in undeveloped countries. Mobile communication and computing devices, especially, have become the means by which countless millions conduct their personal and professional interactions with the world. It has become almost impossible for many people, especially those in the business world, who use these devices as a means to improve productivity, to function without access to their electronic devices.

However, with this tremendous proliferation in the use of electronic devices, there has developed a tradeoff between enhanced productivity and simplicity or convenience. As handheld devices evolved to perform more and more tasks, the complexity of the interfaces required to interact which these devices has likewise increased. Many of today's handheld devices come equipped with some variation or another of a full typewriter keyboard. Some devices have fixed keyboards which are electromechanical in nature, while others project a keyboard, a key pad or some variation of either onto a display associated with a touch screen sensor array. Because of the need to keep mobile or handheld devices compact enough to carry around, many of the physical and virtual (i.e. projected keyboards and keypads) implemented on these devices have keys or other interface components which are quite small relative to an average human finger, thus difficult to operate.

Thus, there is a need for improved methods, circuits, apparatus and systems for interfacing with an electronic device.

SUMMARY OF THE INVENTION

The present invention includes methods, circuits, devices, systems and associated computer executable code for interacting with a computing platform screen. According to some embodiments, there may be provided a multimode Touchless Human Machine Interface (TLHMI) which may facilitate interaction or interfacing with a computing platform display screen. The TLHMI may also be referred to as a Computing Platform Display Screen Interaction Facilitating System. The multimode TLHMI may be integral or otherwise functionally associated with a computing platform. The TLHMI may be adapted to touchlessly detect, for example through a video camera, the presence, position, orientation and velocity of some or all portions of a subject/person within a detection zone of one or more touchless sensor integral or otherwise functionally associated with the TLHMI. The TLHMI detectable subject portions may include the subject's head, shoulders, torso, legs, feet, arms, hands, fingers and/or objects attached to or being held by the subject. The TLHMI may identify which detected movements, of the one or more subject portions, is intended for interaction with the computing platform, and the TLHMI may track the identified movement. The TLHMI may be adapted to track the position, orientation, velocity and/or gestures of a subject portion which has been identified as intended for interaction with the computing platform. The TLHMI may be include a User Input Generator adapted to generate a computing platform user input signal in response to tracking of the position, orientation, velocity and/or gestures of a subject portion which has been identified as intended for interaction with the computing platform. The TLHMI may be adapted to switch between two or more modes of operation in response to detection or identification of one or more parameters of a tracked subject portion (e.g. hand), wherein identified tracked portion parameters may include speed, direction, position, orientation, motion pattern, or gesture.

According to some embodiments of the present invention, the TLHMI may be integral or functionally associated with one or more touchless sensors, including: (1) image sensors, (2) image sensor arrays, (3) electrostatic sensors, (4) capacitive sensors, (5) inductive sensors, (6) optical gated array sensors, (7) LIDAR based sensors, or (8) any other functionally suited sensor that may touchlessly sense speed, direction, position, orientation, motion pattern, or gesture of a subject portion or implement connected to a subject portion. The touchless sensor may be integral with a computing platform or with a screen of a computing platform. According to some embodiments, the TLHMI may be at least partially in the form of computer executable code running on the computing platform.

According to some embodiments of the present invention, the TLHMI operating in a first mode of operation may generate a first user input signal in response to a given tracked motion, and may generate a second user input signal, different from the first user input signal, in response to the same given tracked motion while operating in a second mode of operation. For example, a transition in a TLHMI mode may alter a ratio of "detected motion" to "pointer element movement deviation". A TLHMI mode transition may also alter a rendering aspect of one or more elements on a screen. TLHMI mode transition may also alter an order, grouping and/or visibility of one or more elements on a screen. Transitions between a first mode and a second mode of operation may be triggered by detection or identification of motion parameters or detected gesture parameters, such as: (1) subject portion (e.g. hand) speed, (2) subject portion motion direction, (3) subject portion orientation or configuration, and/or (4) predefined mode transitioning gestures.

According to embodiments of the present invention, a TLHMI which is integral or otherwise associated with a computing platform may touchlessly detect and/or track motions or gestures of a computer platform user. In response to the detected/tracked motions or gestures, the TLHMI may generate and present to the computing platform a user input signal (native signal, standard or customized signals) defined within a "Detected Motion to Screen Element Deviation Mapper" (DMSEM) as corresponding to the detected/tracked motions or gestures. Generated user input signal types (also referred to as events) may include: (1) mouse movement or clicking events, (2) touchpad movement or tapping events, (3) keypad or keyboard events, (4) screen scrolling events, and/or (5) any other user input signals or events known today or to be devised in the future.

The computing platform may include graphical user interface logic (GUIL) and circuitry, according to some embodiments, including: (1) Graphical User Interface (GUI) rendering code, (2) Display Drivers, (3) Graphics Processing Unit (GPU), and/or (4) VGA/HDM/DVI out circuits, for generating or rendering video information at least partially indicative of a user's interaction with the computing platform. The GUIL may be adapted to render screen elements such as screen graphics, images, icons, characters, documents, images, video, control elements and user input elements such as pointers, cursors or virtual environment avatars. The GUIL may re-render and move one or more user input elements (e.g. pointer) responsive to the computing platform receiving a user input signal, either through native/conventional user interfaces such as a mouse, a keyboard, touchscreen sensors, etc., or through the TLHMI according to embodiments of the present invention. In response to a TLHMI mode transition, the GUIL may alter one or more rendering aspects of one or more screen elements, such as a user input element (e.g. pointer) or the area around the user input element.

The TLHMI may include or be otherwise functionally associated with a detected motion to screen element deviation mapper (DMSEM) according to embodiments of the present invention. The DMSEM may receive a signal or other indicator indicative of a tracked user motion (direction, magnitude and velocity), and in response to receiving said indicator may: (1) determine or estimate a direction and magnitude by which to move or deviate a screen element such as a user input element (e.g. pointer), and (2) generate and provided to a user input module of the computing platform a user input signal intended to effectuate the user input element deviation. According to some embodiments, the DMSEM may include or be functionally associated with a User Input Generator for generating user input signals conveyed to a user input module of a computing platform.

The DMSEM may use a first ratio of detected motion to user input element deviation while operating in a first mode. For example, the DMSEM may generate user inputs signals intended to move a screen (mouse) pointer by one centimeter for each centimeter of tracked user motion while operating in the first mode. The DMSEM may use a second ratio of detected motion to user input element deviation, different from said first ratio, while operating in a second mode. For example, the DMSEM may generate user inputs signals intended to move a screen (mouse) pointer by one centimeter for each three centimeters of detected user motion while operating in the second mode.

The DMSEM may switch between each of two or more modes, and associated detected motion to user input element deviation ratios, in response to detection and identification of a mode transitioning parameter within a tracked motion or gesture. According to some embodiments, the motion or gesture itself may be a mode transitioning parameter. Detection of a mode transitioning parameter within a tracked motion or gesture may be performed by the DMSEM, and the DMSEM may respond to the detection by initiating TLHMI mode transition. Alternatively, detection of a mode transitioning parameter within a detected motion or gesture may be performed by a module of the TLHMI other than the DMSEM, for example a Mode Transition Detection Module (MTDM). According to embodiments including a MTDM, the MTDM may signal the DMSEM to transition between modes and ratios upon the MTDM identifying a mode transitioning parameter within a tracked motion or gesture. Irrespective of whether the mode transitioning parameter is identified by a discrete-standalone module or by a sub-module of the DMSEM, a module which performs the function of identifying mode transitioning parameters within a tracked motion or tacked gesture may be referred to as a Mode Transition Detection Module (MTDM).

Examples of mode transitioning parameters within detected or tracked motions or gestures may include: (1) speed of tracked subject portion or limb (e.g. hand or object held by subject), (2) direction of motion or tracked subject portion, (3) position or tracked subject portion, (4) orientation of tracked subject portions, (5) configuration of tracked subject portion, and (5) predefined gesture performed or executed by subject portion.

Various detected mode transitioning parameters may trigger anyone of a number of TLHMI operational transitions according to embodiments of the present invention. More specifically, a slowing or a pause in the movement of a tracked subject/user portion (e.g. hand) may be defined as a mode transitioning parameter which may trigger a switch/transition of the TLHMI from a first to a second mode of operation, wherein the second mode of operation may be associated with a higher DMSEM ratio between detected motion (e.g. hand movement) to user interface element (e.g. pointer). That is, a given tracked movement of a hand will result is a smaller pointer deviation in the second mode than in the first mode. Conversely, acceleration of a tracked hand may be defined as a mode transitioning parameter and may cause a mode transitioning event back to the first mode, such that the given tracked movement of a hand will result in a larger pointer deviation than in the second mode.

Alternatively, movement or repositioning of a tracked subject portion from a first region of the detection zone to a second region (e.g. closer or further from the TLHMI or from a screen associated with the computing platform) may be defined as a mode transitioning parameter according to embodiments of the present invention. For example, positioning or movement of a tracked hand closer to a screen may trigger a switch/transition of the TLHMI from a first to a second mode of operation, wherein the second mode may be associated with a higher DMSEM ratio between detected motion (e.g. hand movement) to user interface element (e.g. pointer). That is, a given tracked movement of a hand, while the hand is closer to the screen, may result in a smaller pointer deviation than the same given movement would have caused had the hand been further from the screen. Conversely, positioning or movement of a tracked hand further away from a screen may be defined as a mode transitioning event back to the first mode, such that the given tracked movement of a hand may result in a larger pointer deviation than in the second mode. In more general terms, different regions of a TLHMI detection zone may be associated with different modes of operation of the TLHMI.

Alternatively, specific orientations or configurations of a tracked subject portion (e.g. a hand) may be defined as mode transitioning parameters according to embodiments of the present invention. For example, orientating or configuring a tracked hand in certain orientations (e.g. up or sideways) or in certain configurations (e.g. open palm or closed fist) may trigger a switch/transition of the TLHMI from a first to a second mode of operation. In more general terms, different orientations or configurations of a tracked subject portion may be associated with different modes of operation of the TLHMI.

According to embodiments of the present invention the TLHMI may include or be otherwise functionally associated with Display Augmentation Logic (DAL), which DAL may also be integral or otherwise functionally associated with the computing platform GUIL. In response to a detection or identification of mode transitioning parameters/events within a tracked subject portion (e.g. hand), as previously described or the like, the DAL may transition modes and accordingly may signal or otherwise cause the GUIL to alter a rendering aspect of one or more elements on a screen of the computing platform. For example: (1) upon the TLHMI transitioning from a first to a second mode, the DAL may cause the GUIL to enlarge a screen region around a user interface element (e.g. pointer) whose movement is driven by the TLHMI; (2) upon the TLHMI transitioning from a first to a second mode, the DAL may cause the GUIL to (generate a) frame a screen region around a user interface element (e.g. pointer) whose movement is driven by the TLHMI; (3) upon the TLHMI transitioning from a second to a first mode, the DAL may cause the GUIL to shrink a screen region around a user interface element (e.g. pointer) whose movement is driven by the TLHMI; and (4) upon the TLHMI transitioning from a second to a first mode, the DAL may cause the GUIL to remove a frame from a screen region around a user interface element (e.g. pointer) whose movement is driven by the TLHMI.

According to some embodiments, the TLHMI may be integral of functionally associated with a computing platform having a touchscreen, for example a cell-phone, a smart-phone, e-book, a notebook computer, a tablet computer, etc. According to some embodiments of the present invention, the TLHMI may provide for adaptive touchscreen input functionality such that an aspect of a rendered keyboard, rendered keypad or any other rendered touchscreen input elements or controls such as rendered control keys, control buttons, slide bars, etc. may be altered responsive to a detected mode transitioning parameter or event of a touchlessly tracked subject portion. For example, the adaptive touch-screen input functionality may alter the size, shape or location of input/control elements in proximity of a finger, limb or implement used by a user to touch the screen.

According to some embodiments of the present invention, one or more sensors such as: (1) image sensors, (2) image sensor arrays, (3) electrostatic sensors, (4) capacitive sensors, or (5) any other functionally suited sensor may touchlessly sense a location and/or motion vector of a finger, limb or implement approaching the touch screen. The sensor(s) may provide to the adaptive touchscreen input arrangement an indication of the sensed position or motion vector of the finger/limb/implement relative to the input elements or keys—thereby indicating which input elements or keys are being approached. In response to the indication, a DAL and/or GUIL associated with the touchscreen input arrangement may cause the size, shape or location of input elements/controls within proximity of the sensed finger, limb or implement to be altered, in order to make the input element more prominent (e.g. larger or in a better location) and more easily engagable.

According to yet further embodiments of the present invention, there may be provided a human interface surface (e.g. touchscreen display) comprising presentation and sensing elements. The presentation elements and the sensing elements may be integrated into a single substrate material or may be part of separate substrates which are mechanically attached to one another in an overlapping manner. According to further embodiments of the present invention, there may be provided a controller (e.g. display drive circuit) adapted to send one or more presentation signals to the presentation elements of the human interface surface based at least partially on data stored in a presentation configuration table (e.g. virtual keyboard layout including location and size of keys) and based on a current state of the device. The current state of the device may be determined based on one or more signals received from the sensing elements and/or based on one or more signals received from the device.

According to further embodiments of the present invention, the controller may associate a function or device command signal with each of the one or more signals received from the sensing elements (e.g. when the sensing elements are touched), wherein the association of a command or function may be at least partially based on data from a first data set in the sensing element configuration table. The data selected from the sensing element configuration table may be correlated to data from the presentation configuration used by the controller to send one or more signals to the presentation elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
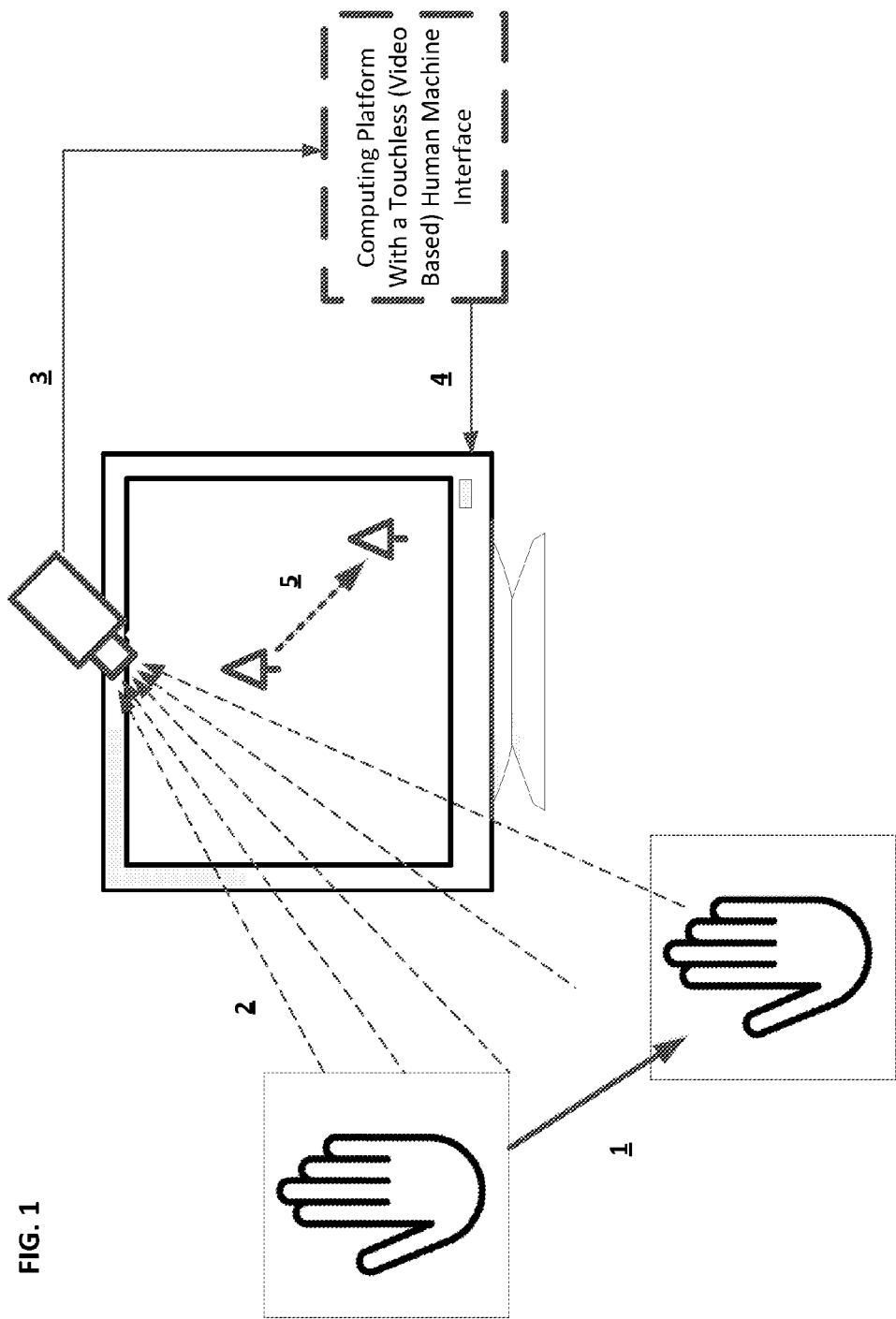
FIG. 1 shows an illustration depicting a user touchlessly interacting with computing platform which is integral or otherwise functionally associated with a Touchless Human Machine Interface (TLHMI), according to embodiments of the present invention, wherein the TLHMI is a video based TLHMI utilizing a video camera.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Turning now to FIG. 1, there is shown, in accordance with some embodiments of the present invention, a basic exemplary configuration of a computing platform functionally associated with a 'Computing Platform Display Screen Interaction Facilitating System'. According to some embodiments, a movement, or change of configuration/position, of a user's limb or organ (1) is sensed by touchless sensors (e.g. light picked up by a camera) (2). The touchless sensors pass data indicative of the sensed movement to a Touchless Human Machine Interface (TLHMI) system or module (3) for user movement detection and movement parameters extraction. Based on the extracted movement parameters, the TLHMI determines the user's movement, whether it calls for a change in the system's current operation mode and into what mode; and, under the current operation mode, what computing platform screen element(s) deviation and/or augmentation does the detected movement(s) call for. Computing platform screen element(s) deviation and/or augmentation reflecting-signals, are passed to a user input module of the computing platform as user input signals, or to a graphic user interface logic module of the computing platform as augmentation commands/instructions (4). Based on the received signals, a graphic user interface generation module (circuitry and/or code) of the computing platform may generate the screen elements deviation(s) and/or augmentation(s) represented by the signals (5).

Figure 2A:
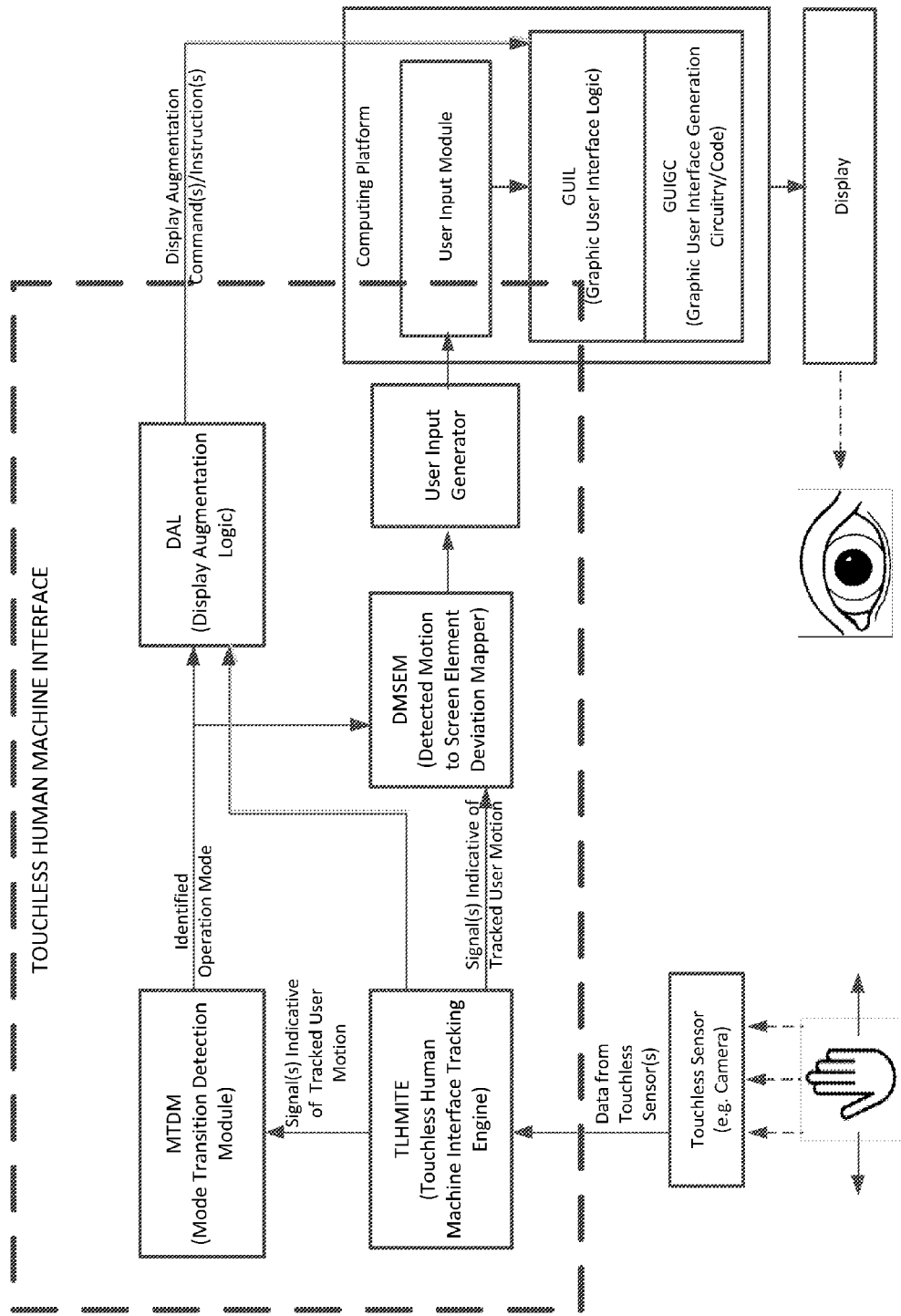
FIG. 2A shows a functional block diagram of an exemplary TLHMI according to embodiments where the TLHMI is at least partially integral with a computing platform, and wherein the TLHMI includes a tracking engine, a detected motion to screen element deviation mapper, display augmentation logic, and a mode transition detection module.

Turning now to FIG. 2A there is shown, in accordance with some embodiments of the present invention, an exemplary configuration of a Touchless Human Machine Interface (TLHMI). According to some embodiments, the Touchless Sensor passes data indicative of user motion(s) to a Touchless Human Machine Interface Tracking Engine (TLHMITE) module for user motion detection and user motion parameter extraction. Detected motion parameters are passed to a Mode Transition Detection Module (MTDM) that determines whether they include operation mode transition parameters/instructions. Based on the current operation mode detected (e.g. changed-to, unchanged) by the MTDM and signal(s), indicative of a detected user motion, that are relayed by the TLHMITE. A Detected Motion to Screen Element Deviation Mapper (DMSEM) generates user input signals to effectuate detected user motions to screen element(s) deviation(s) on a functionally associated computerized platform. Additionally, a Display Augmentation Logic (DAL) may utilize the current operation mode detected (e.g. changed-to, unchanged) by the MTDM and signal(s), indicative of a detected user motion, that are relayed by the TLHMITE to generate augmentation command(s)/instruction(s) to effectuate detected user motions to screen element(s) augmentation on a functionally associated computerized platform.

Figure 2B:
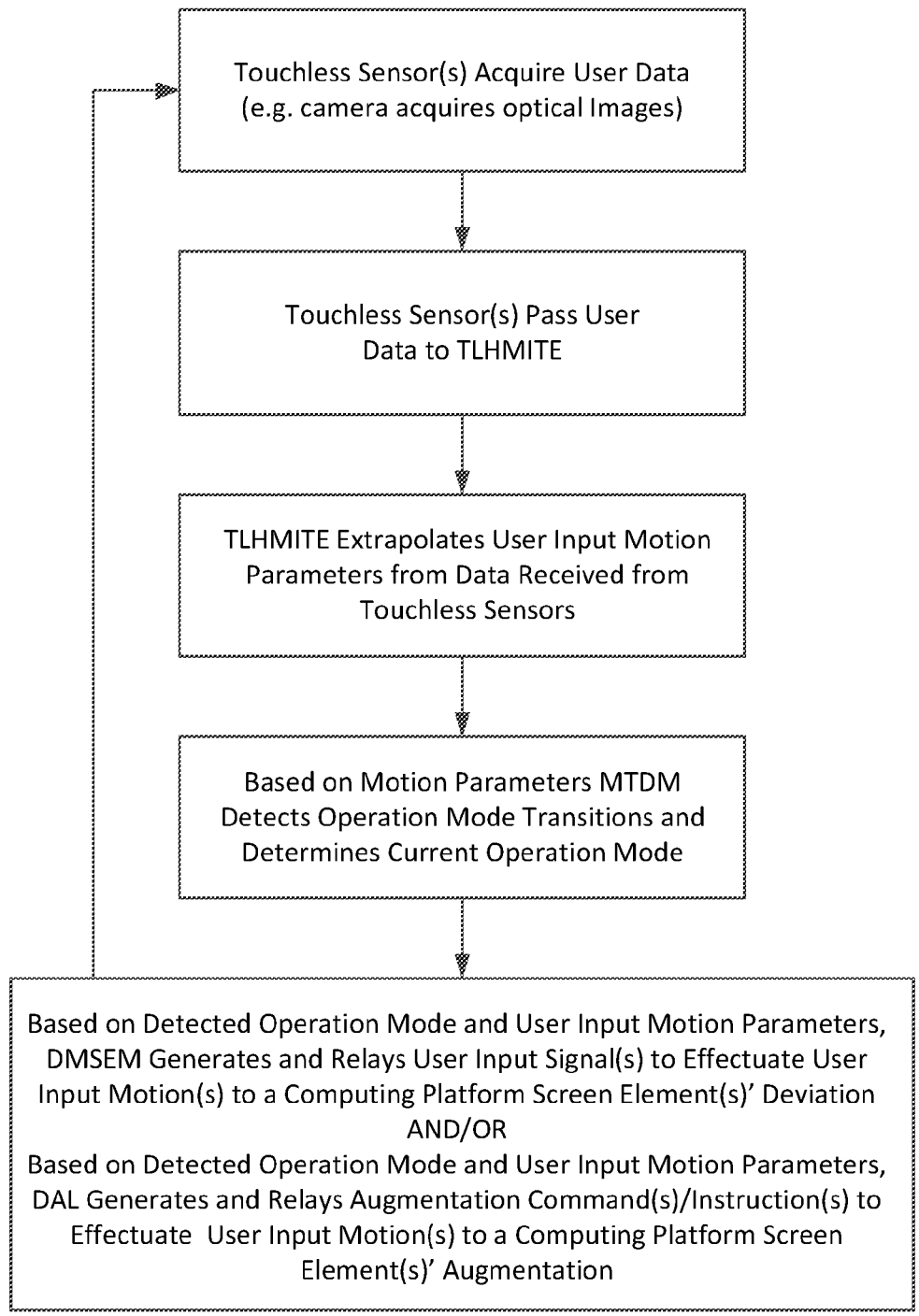
FIG. 2B is a flow chart including the steps of exemplary methods implemented by an exemplary TLHMI according to embodiments of the present invention, such as the TLHMI shown in FIG. 2A.

Turning now to FIG. 2B, there is shown, in accordance with some embodiments of the present invention, a flow chart showing the steps performed by an exemplary Touchless Human Machine Interface (TLHMI) module. According to some embodiments, initially, the touchless sensor(s) acquire user data (e.g. camera acquires optical images), touchless sensor(s) then pass the acquired user data to the TLHMITE that extrapolates user input motion parameter(s) and/or signal(s) indicative of detected user motion(s) from the data received from the touchless sensor(s). Based on the motion parameters and/or the signal(s) indicative of detected user motion(s) the MTDM detects/identifies operation mode transitions and determines a current operation mode. Based on the detected operation mode and user input motion parameters: (1) The DMSEM Generates and relays user input signal(s) to effectuate user input motion(s) to a computing platform screen element(s)' deviation; and/or (2) The DAL generates and relays augmentation command(s)/instruction(s) to effectuate user input motion(s) to a computing platform screen element(s)' augmentation. The process may then repeat itself, based on new user data acquired by the touchless sensor(s).

Figure 3:
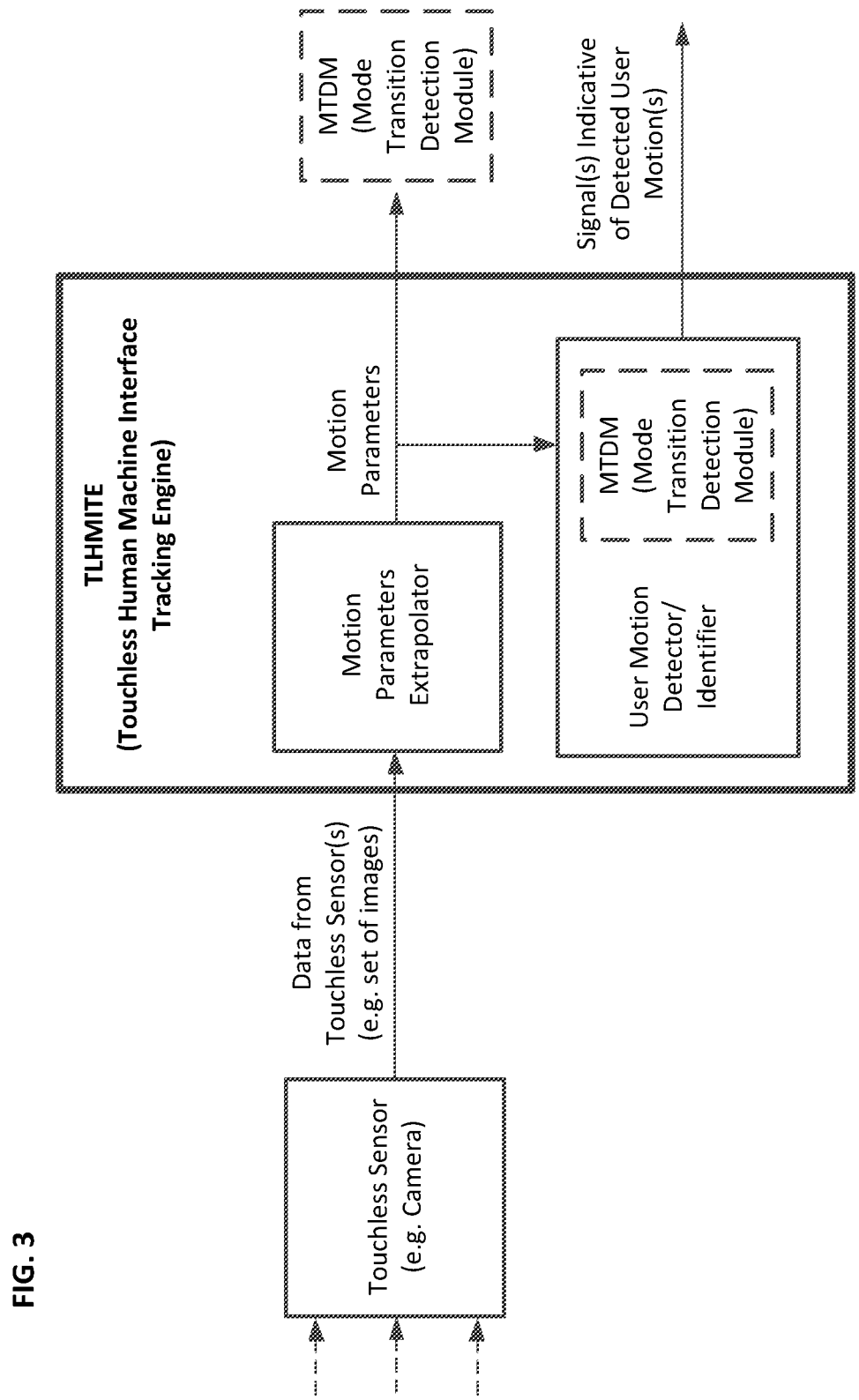
FIG. 3 is a functional block diagram of an exemplary Touchless Human Machine Interface Tracking Engine (TLHMITE) according to some embodiments.

Turning now to FIG. 3, there is shown, in accordance with some embodiments of the present invention, an exemplary Touchless Human Machine Interface Tracking Engine (TLHMITE) module of a Touchless Human Machine Interface (TLHMI) module. According to some embodiments, the TLHMITE receives data indicative of user motion(s) from one or more touchless sensors (e.g. from a camera). The TLHMITE shown comprises: (1) a Motion Parameter Extrapolator for extracting user motion parameters out of the data received from the touchless sensors; and (2) a User Motion Detector for detecting predefined user motions within the extracted motion parameters. A Mode Transition Detection module (MTDM) may use the user motion parameters and/or the detected user motions to search for, and detect, user motion(s)/behavior(s)—predefined as mode transitioning motion(s). The MTDM may accordingly determine whether, and what type of, mode transitioning command has been received from the user and further relay this information. The MTDM may be part of the TLHMITE (shown as part of the User Motion Detector in this exemplary figure), or may be implemented as a separate module functionally associated with the TLHMITE (also shown as a separate part from the TLHMITE in this exemplary figure).

Figure 4:
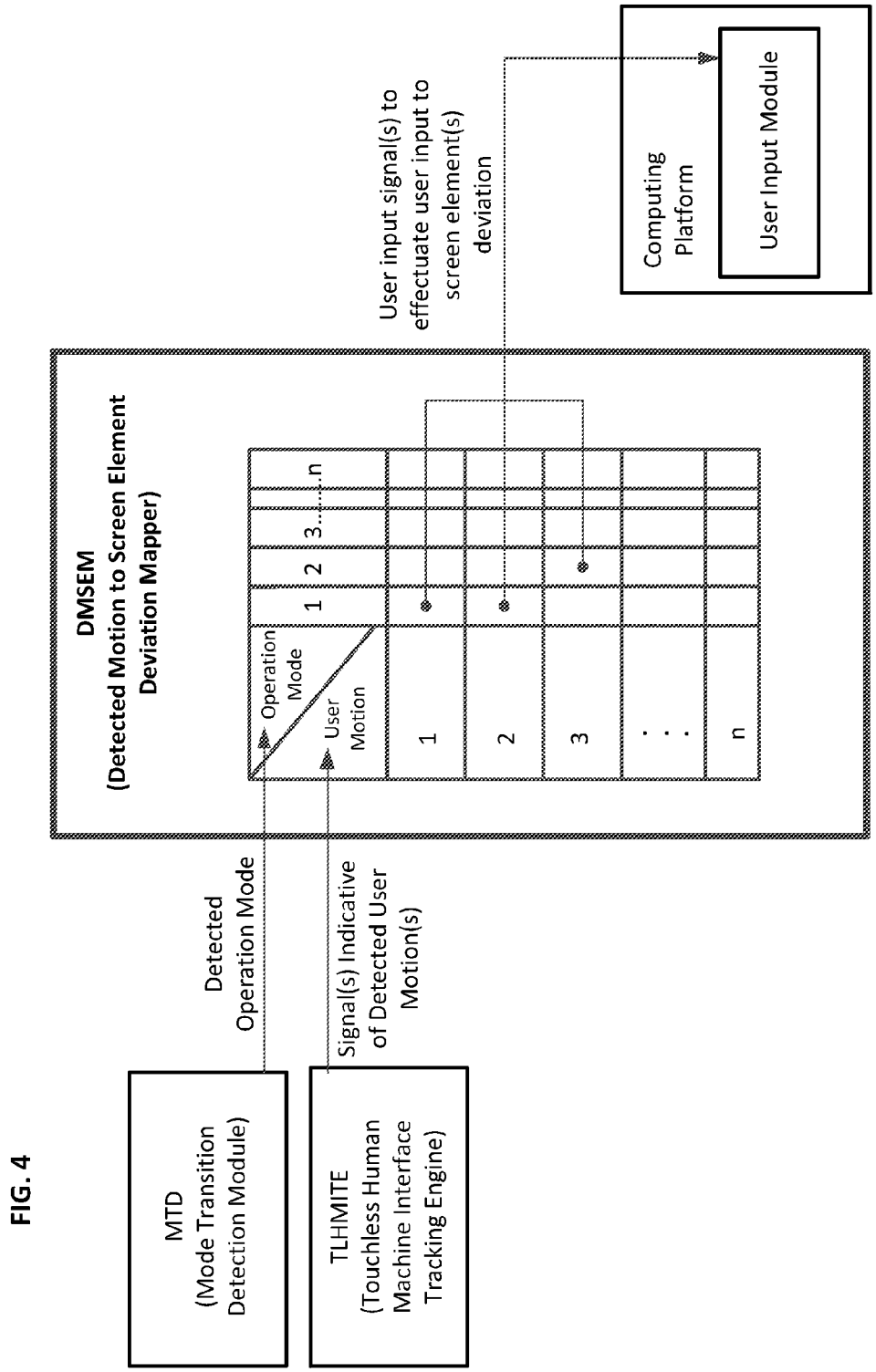
FIG. 4 is functional block diagram of an exemplary Detected Motion to Screen Element Deviation Mapper (DMSEM) according to embodiments.

Turning now to FIG. 4, there is shown, in accordance with some embodiments of the present invention, an exemplary Detected Motion to Screen Element Deviation Mapper (DMSEM) module of a Touchless Human Machine Interface (TLHMI) module. According to some embodiments, the DMSEM receives an indication of a detected operation mode from the MTDM and signal(s) indicative of detected user motions from the TLHMITE. The DMSEM may access a mapping table in which, for every pair of an operation mode and a user motion (or set of motions), a corresponding user input signal (or set of signals) may be recorded and referenced; such that for a given user motion, under a first operation mode, a first user input, or set of inputs (to be relayed to a functionally associated computing platform), may be selected; and for the same given user motion, under a second operation mode, a second user input, or set of inputs, may be selected. Selected user input signal(s) may then be relayed to the User Input Module of a functionally associated computing platform.

Figure 5:
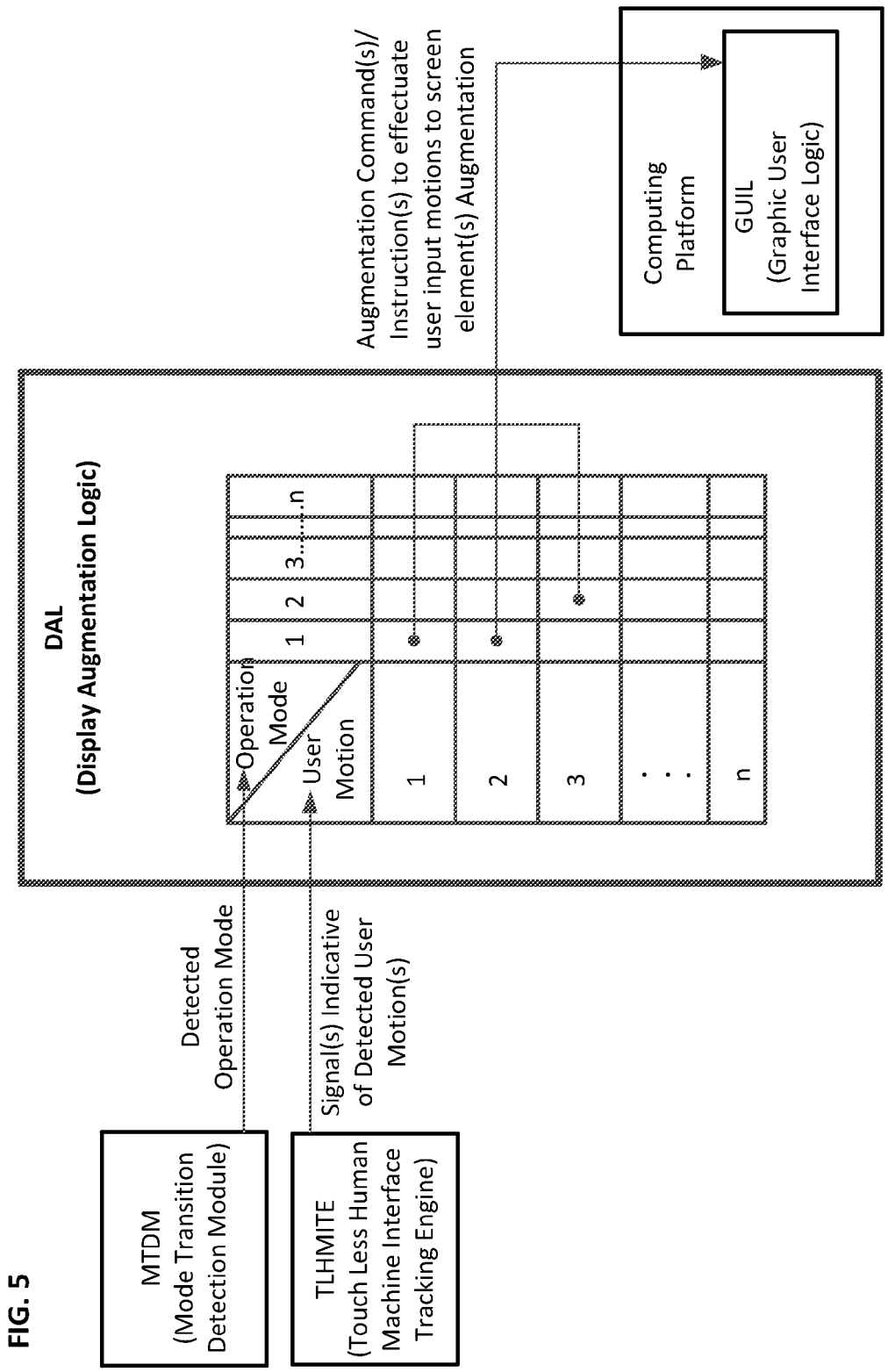
FIG. 5 is a functional block diagram of an exemplary Display Augmentation Logic (DAL) according to embodiments.

Turning now to FIG. 5 there is shown, in accordance with some embodiments of the present invention, an exemplary Display Augmentation Logic (DAL) module of a Touchless Human Machine Interface (TLHMI) module. According to some embodiments, the DAL receives the detected operation mode from the MTDM and signal(s) indicative of detected user motions from the TLHMITE. The DAL may access a mapping table in which, for every pair of an operation mode and a user motion (or set of motions), a corresponding augmentation command/instruction (or set of commands/instructions) may be referenced; such that for a given user motion, under a first operation mode, a first augmentation command, or set of commands (to be relayed to a functionally associated computing platform), may be selected; and for the same given user motion, under a second operation mode, a second augmentation command, or set of commands, may be selected. Selected user augmentation command(s) may then be relayed to the Graphic User Interface Logic (GUIL) of a functionally associated computing platform.

Figure 6A:
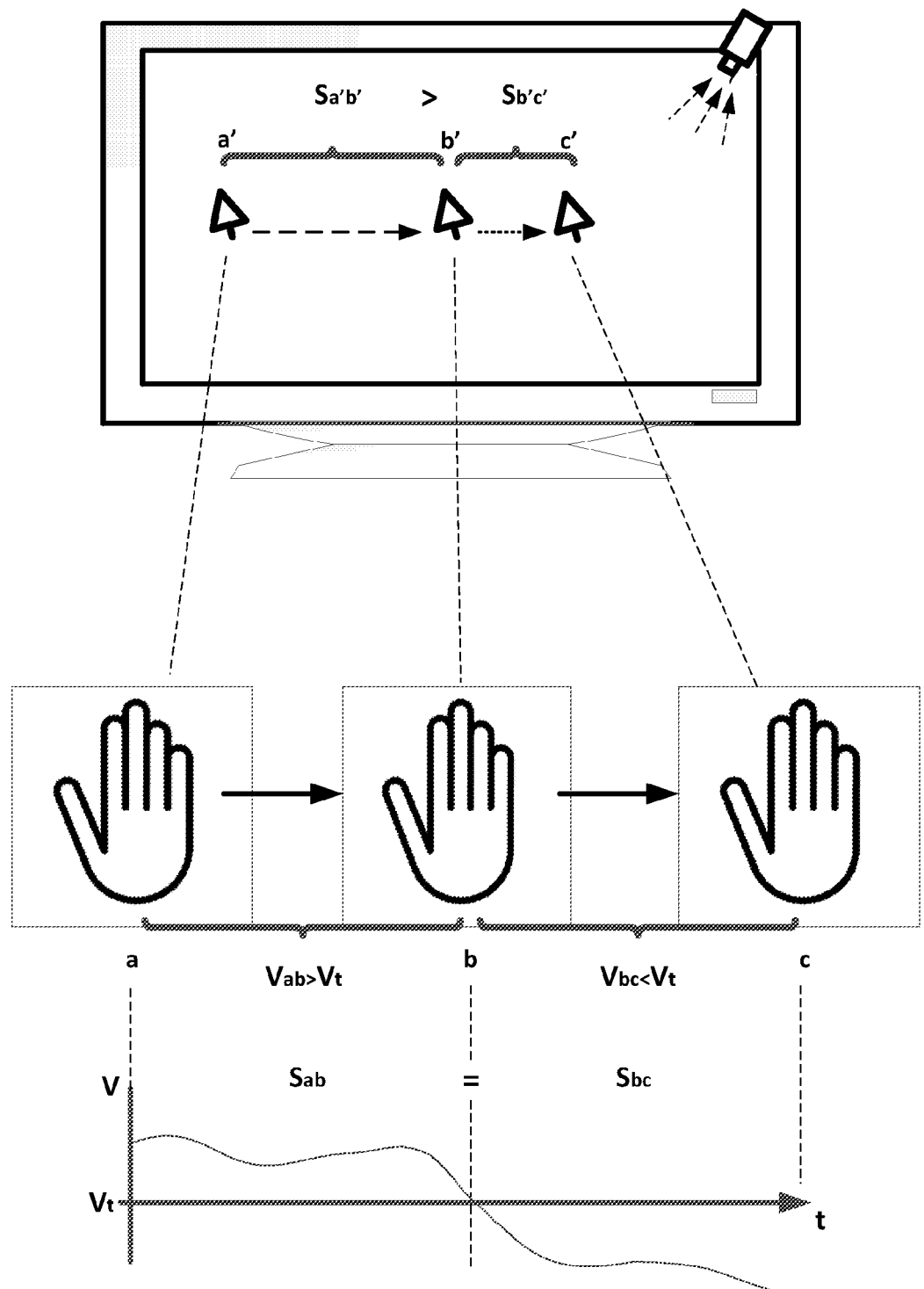
FIG. 6A is an illustration depicting use of an exemplary TLHMI coupled to a screen of a computing platform, wherein mode transitioning is triggered by a slowing down of a user's hand, and the mode transition results in a higher detected motion to screen element deviation ratio.

Turning now to FIG. 6A there is shown, in accordance with some embodiments of the present invention, an exemplary operation configuration of a computing platform functionally associated with a Touchless Human Machine Interface (TLHMI) module, wherein a change in the speed of motion of a user's limb or organ may trigger an operation mode transition and, as a result, a screen element behavior deviation. The user's hand may initially travel, from point a to point b (distance Sab), at a speed which is higher than a predetermined threshold speed, causing the screen cursor to travel, from point a' to point b' (distance Sa'b'). As the motion speed at which the hand travels decreases below the predetermined threshold (around point b), the ratio of the distance traveled by the hand to the respective distance traveled by the screen cursor may increase. Accordingly, while the distance traveled by the hand from point a to point b may be similar to the distance traveled by the hand from point b to point c (Sab=Sbc), the respective distances traveled by the screen cursor—Sa'b' and Sb'c'—may not be similar (Sa'b'>Sb'c'). In this exemplary embodiment, the 'hand traveled distance' to 'cursor traveled distance' ratio has increased as the user hand slowed beyond the threshold speed Vt. For example, if for every centimeter traveled by the hand at a speed greater than Vt the screen cursor traveled a similar 1 centimeter distance, as the speed decreased below Vt the screen cursor only moved a single centimeter for every 2 centimeters traveled by the user hand.

Figure 6B:
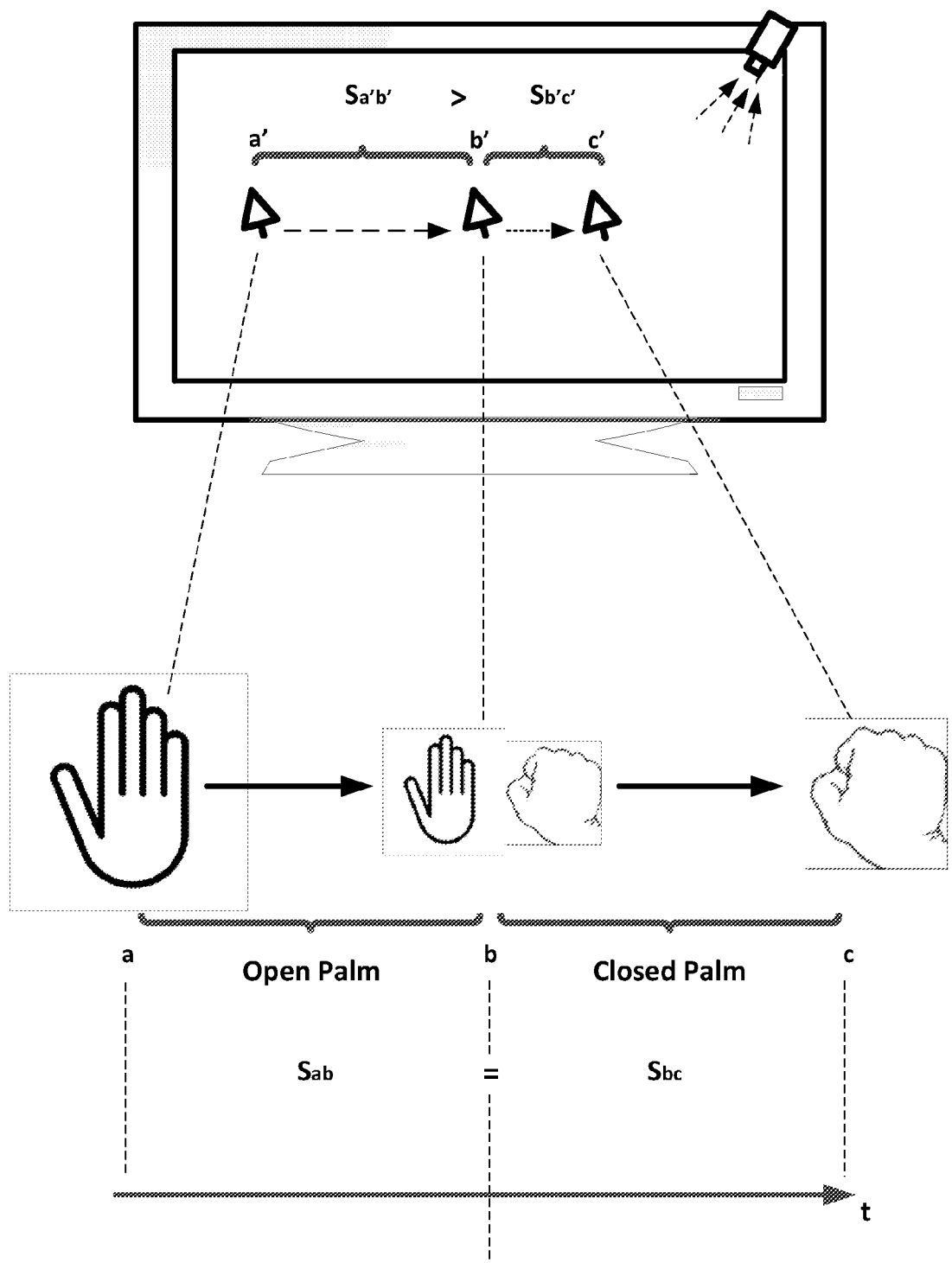
FIG. 6B is an illustration depicting use of an exemplary TLHMI coupled to a screen of a computing platform, wherein mode transitioning is triggered by a closing into a first of a user's hand, and the mode transition results in a higher detected motion to screen element deviation ratio.

Turning now to FIG. 6B there is shown, in accordance with some embodiments of the present invention, an exemplary operation configuration of a computing platform functionally associated with a Touchless Human Machine Interface (TLHMI) module, wherein a change in the configuration of a user's limb or organ may trigger an operation mode transition and as a result a screen element behavior deviation. The user's hand may initially travel, from point a to point b (distance Sab), with its palm open, causing the screen cursor to travel from point a' to point b' (distance Sa'b'). As the hand's palm closes (around point b) the ratio of the distance traveled by the hand to the respective distance traveled by the screen cursor may increase. Accordingly, while the distance traveled by the hand from point a to point b may be similar to the distance traveled by the hand from point b to point c (Sab=Sbc), the respective distances traveled by the screen cursor—Sa'b' and Sb'c'—may not be similar (Sa'b'>Sb'c'). In this exemplary embodiment, the 'hand traveled distance' to 'cursor traveled distance' ratio has increased as the user hand's palm closed. For example, if for every centimeter traveled by the hand with an open palm the screen cursor traveled a similar 1 centimeter distance, as the palm closed the screen cursor only moved a single centimeter for every 2 centimeters traveled by the user hand.

Figure 6C:
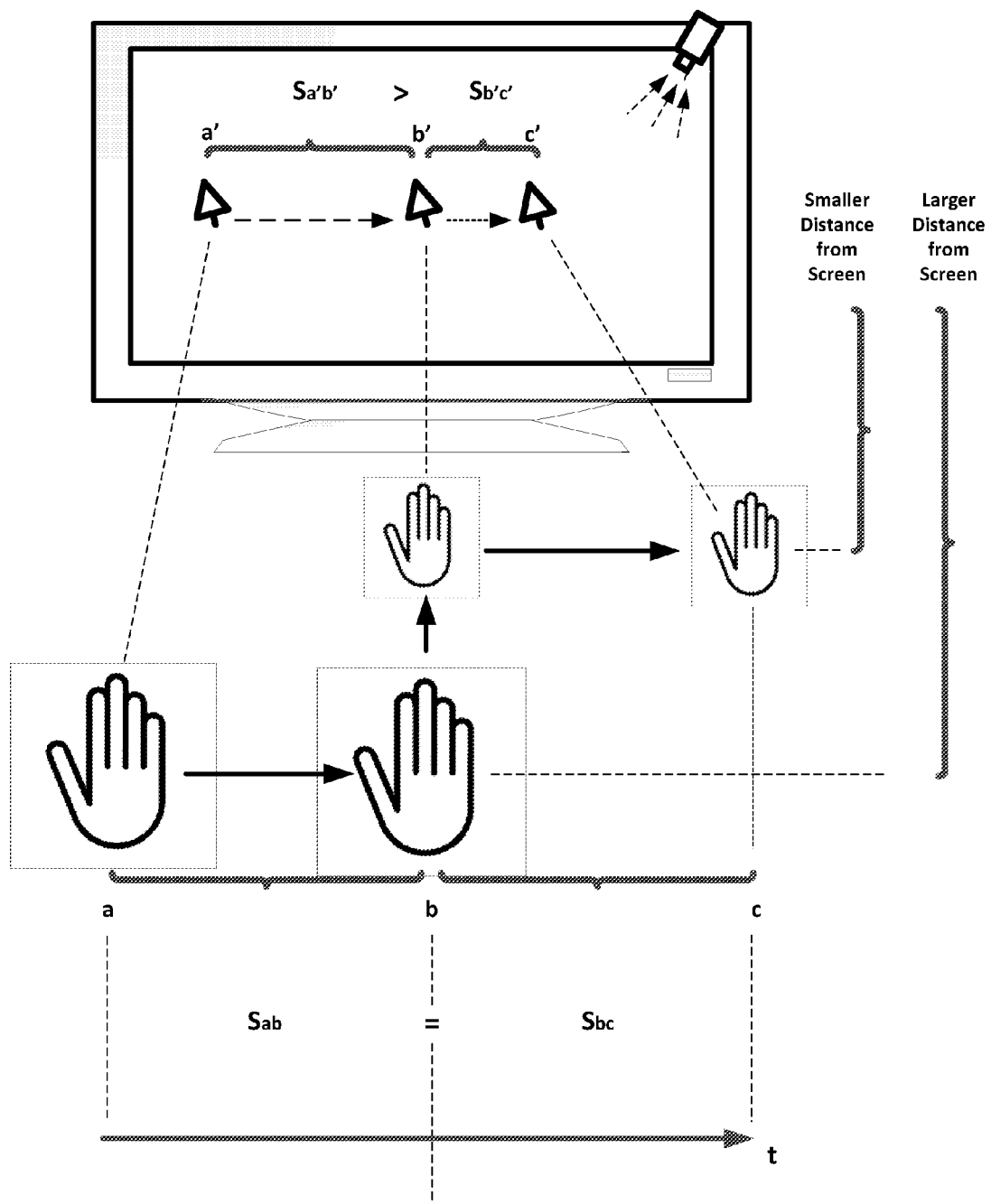
FIG. 6C is an illustration depicting use of an exemplary TLHMI coupled to a screen of a computing platform, wherein mode transitioning is triggered by moving a user's hand closer to the screen, and the mode transition results in a higher detected motion to screen element deviation ratio.

Turning now to FIG. 6C there is shown, in accordance with some embodiments of the present invention, an exemplary operation configuration of a computing platform functionally associated with a Touchless Human Machine Interface (TLHMI) module, wherein a change in the position of a user's limb or organ may trigger an operation mode transition and as a result a screen element behavior deviation. The user's hand may initially travel, from point a to point b (distance Sab), at a first distance from the screen or the touchless sensor (e.g. camera), causing the screen cursor to travel from point a' to point b' (distance Sa'b'). As the hand decreases its distance from the screen or the touchless sensor (around point b) to a second distance smaller than the first distance, the ratio of the distance traveled by the hand to the respective distance traveled by the screen cursor may increase. Accordingly, while the distance traveled by the hand from point a to point b may be similar to the distance traveled by the hand from point b to point c (Sab=Sbc), the respective distances traveled by the screen cursor—Sa'b' and Sb'c'—may not be similar (Sa'b'>Sb'c'). In this exemplary embodiment, the 'hand traveled distance' to 'cursor traveled distance' ratio has increased as the user hand neared the screen or touchless sensor. For example, if for every centimeter traveled by the hand at a distance of 20 centimeters from the screen, the screen cursor traveled a similar 1 centimeter distance, as the palm neared the screen, e.g. to a distance of 10 centimeters, the cursor only moved a single centimeter for every 2 centimeters traveled by the user hand.

Figure 7A:
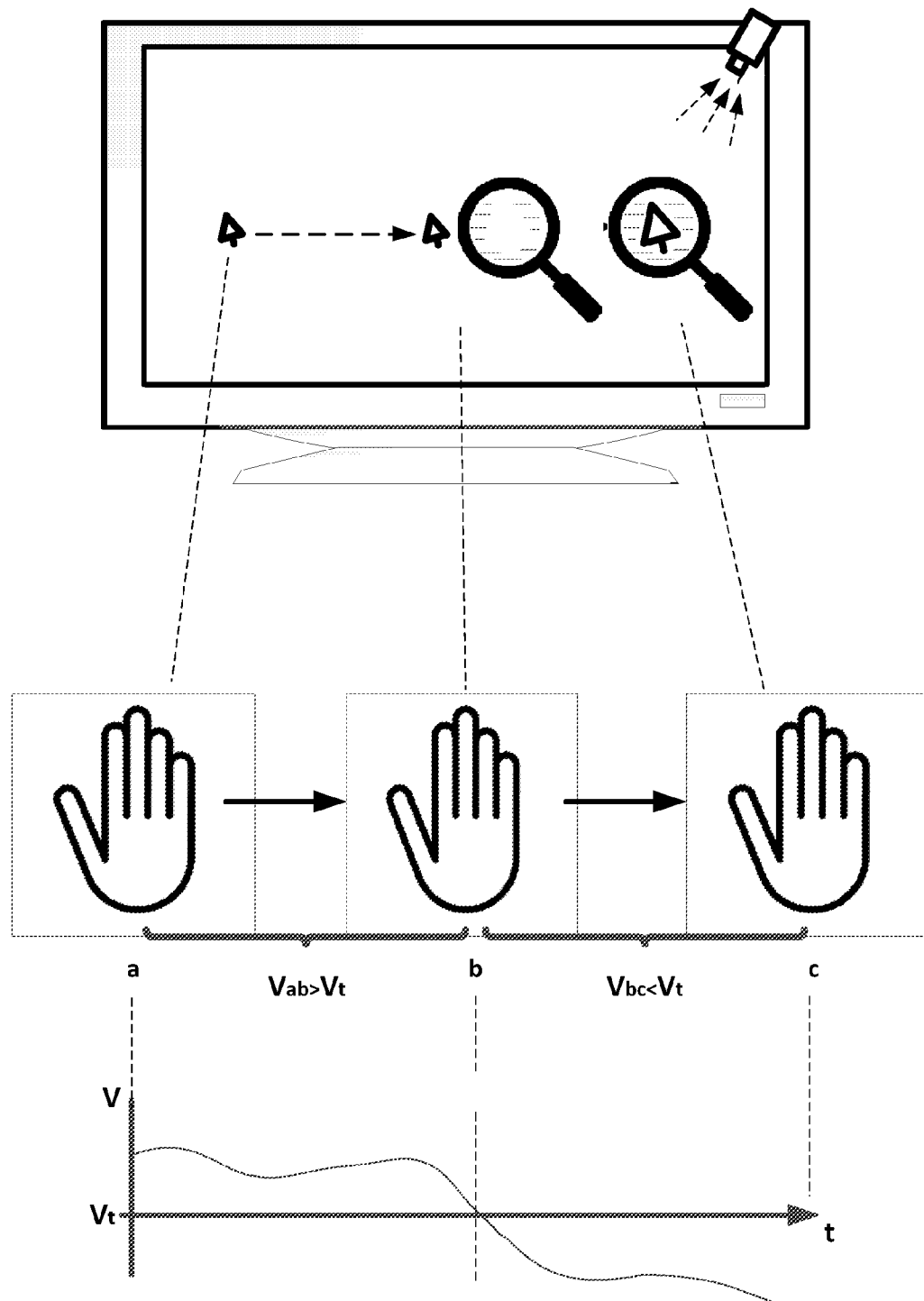
FIG. 7A is an illustration depicting use of an exemplary TLHMI coupled to a screen of a computing platform, wherein mode transitioning is triggered by a slowing down of a user's hand, and the mode transition results in a magnification of a screen element and the area around it.

Turning now to FIG. 7A, there is shown, in accordance with some embodiments of the present invention, an exemplary operation configuration of a computing platform functionally associated with a Touchless Human Machine Interface (TLHMI) module, wherein a change in the speed of motion of a user's limb or organ may trigger an operation mode transition and as a result a screen element augmentation. The user's hand may initially travel, from point a to point b, at a speed which is higher than a predetermined threshold speed, causing the screen cursor to travel from point a' to point b'. As the motion speed, at which the hand travels, decreases below the predetermined threshold (around point b) a 'magnifying glass' type augmentation around the screen cursor's location may appear on the screen, such that a certain area around the cursor may be zoomed in on as long as the hand's speed remains below the predefined speed threshold (Vt). Once the hand's travelling speed increases back to a speed higher than Vt the 'magnifying glass' augmentation may disappear and the screen cursor, and its surrounding area, may return to their regular shape, size and view.

Figure 7B:
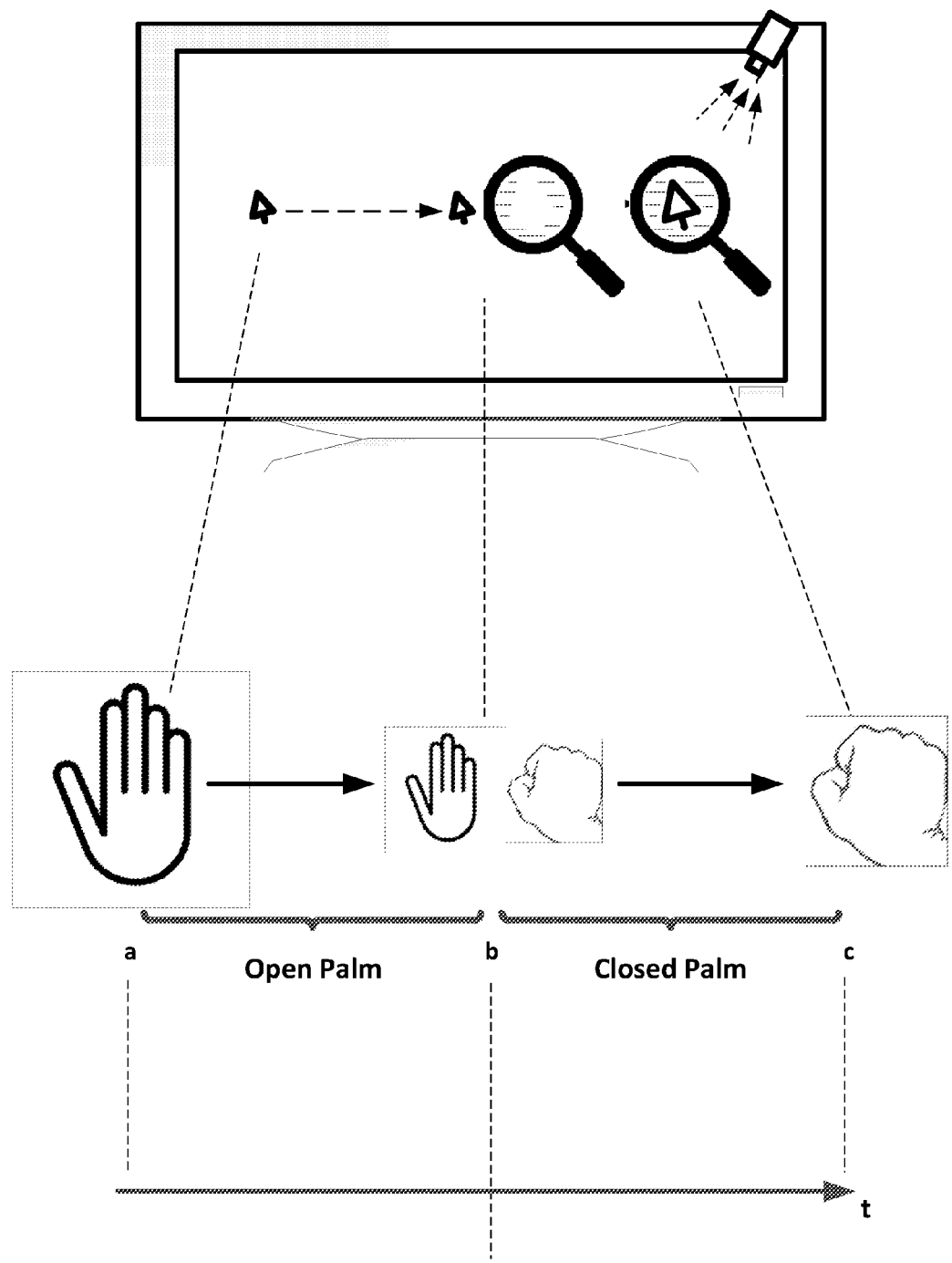
FIG. 7B is an illustration depicting use of an exemplary TLHMI coupled to a screen of a computing platform, wherein mode transitioning is triggered by a closing into a first of a user's hand, and the mode transition results in a magnification of a screen element and the area around it.

Turning now to FIG. 7B there is shown, in accordance with some embodiments of the present invention, an exemplary operation configuration of a computing platform functionally associated with a Touchless Human Machine Interface (TLHMI) module, wherein a change in the configuration of a user's limb or organ may trigger an operation mode transition and as a result a screen element augmentation. The user's hand may initially travel, from point a to point b, with its palm open, causing the screen cursor to travel, from point a' to point b'. As the hand's palm closes (around point b) a 'magnifying glass' type augmentation around the screen cursor's location may appear on the screen, such that a certain area around the cursor may be zoomed in on as long as the hand's palm remains closed. Once the hand's palm reopens the 'magnifying glass' augmentation may disappear and the screen cursor, and its surrounding area, may return to their regular shape, size and view.

Figure 7C:
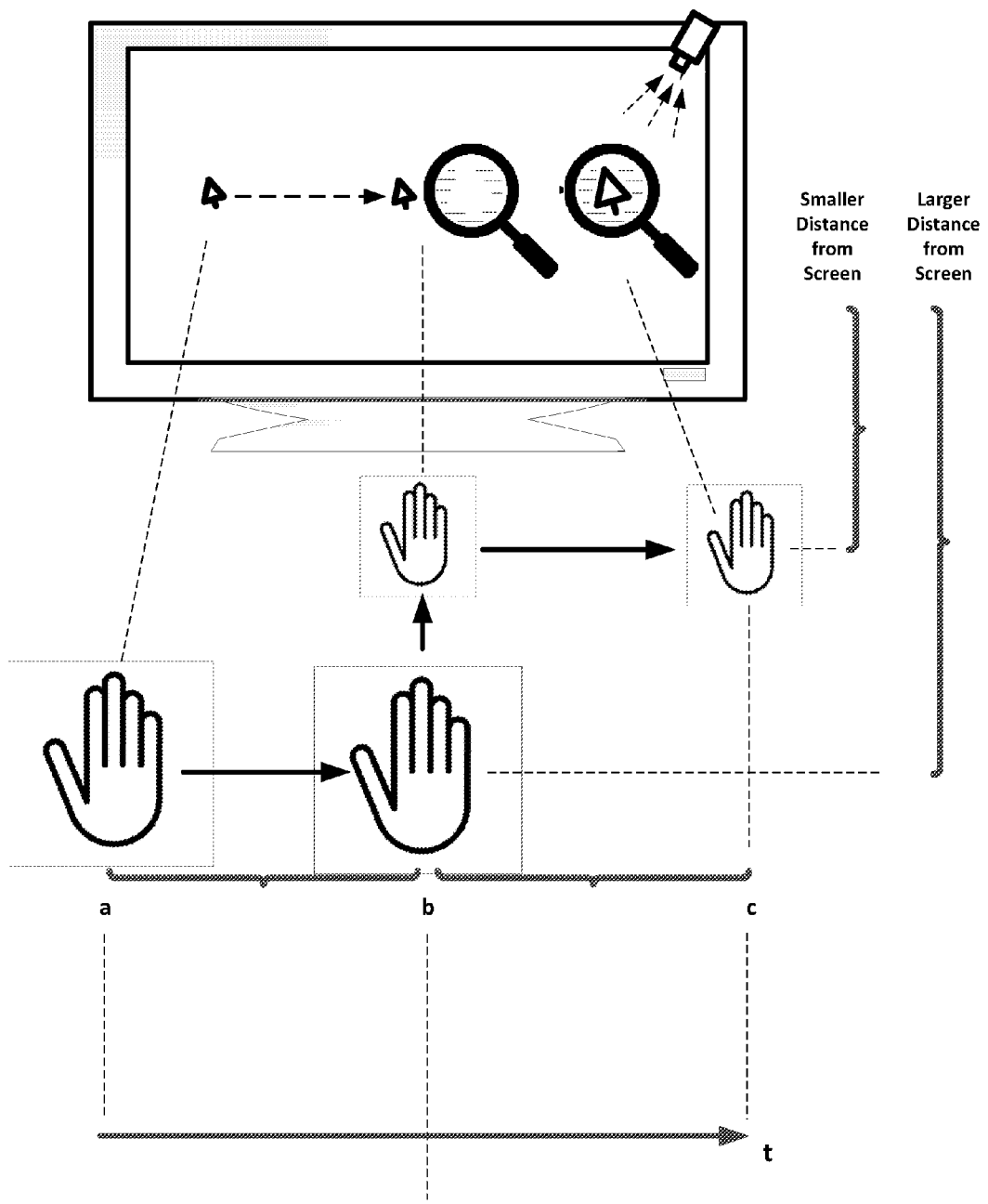
FIG. 7C is an illustration depicting use of an exemplary TLHMI coupled to a screen of a computing platform, wherein mode transitioning is triggered by moving a user's hand closer to the screen, and the mode transition results in a magnification of a screen element and the area around it.

Turning now to FIG. 7C there is shown, in accordance with some embodiments of the present invention, an exemplary operation configuration of a computing platform functionally associated with a Touchless Human Machine Interface (TLHMI) module, wherein a change in the position of a user's limb or organ may trigger an operation mode transition and as a result a screen element augmentation. The user's hand may initially travel, from point a to point b, at a first distance from the screen or the touchless sensor (e.g. camera), causing the screen cursor to travel from point a to point b. As the hand decreases its distance from the screen or the touchless sensor (around point b) to a second distance, smaller than the first distance, a 'magnifying glass' type augmentation around the screen cursor's location may appear on the screen, such that a certain area around the cursor may be zoomed in on as long as the hand remains at a distance equal to or smaller than the second distance. Once the hand increases its distance back to, or beyond, the first distance, the 'magnifying glass' augmentation may disappear and the screen cursor, and its surrounding area, may return to their regular shape, size and view.

Figure 8A:
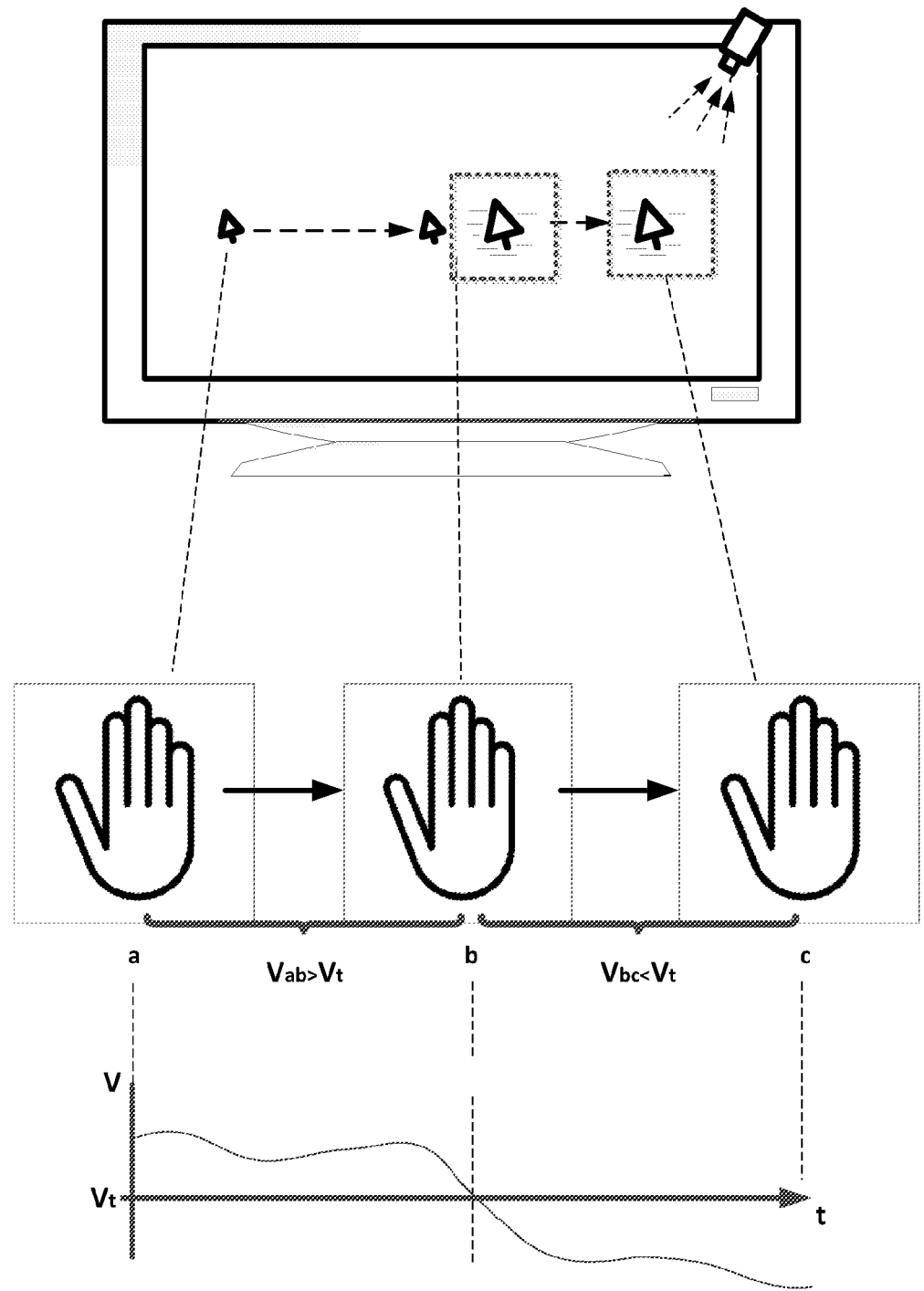
FIG. 8A is an illustration depicting use of an exemplary TLHMI coupled to a screen of a computing platform, wherein mode transitioning is triggered by a slowing down of a user's hand, and the mode transition results in a framing and magnification of a screen element and the area around it.

Turning now to FIG. 8A there is shown, in accordance with some embodiments of the present invention, an exemplary operation configuration of a computing platform functionally associated with a Touchless Human Machine Interface (TLHMI) module, wherein a change in the speed of motion of a user's limb or organ may trigger an operation mode transition and, as a result, a screen element augmentation. The user's hand may initially travel, from point a to point b, at a speed which is higher than a predetermined threshold speed, causing the screen cursor to travel from point a' to point b'. As the motion speed, at which the hand travels, decreases below the predetermined threshold (around point b) a 'magnifying glass' type augmentation around the screen cursor's location may appear within a frame on the screen, such that a certain area around the cursor may be zoomed in on and framed as long as the hand's speed remains below the predefined speed threshold (Vt). Once the hand's travelling speed increases back to a speed higher than Vt, the 'magnifying glass' augmentation and frame may disappear and the screen cursor, and its surrounding area, may return to their regular shape, size and view.

Figure 8B:
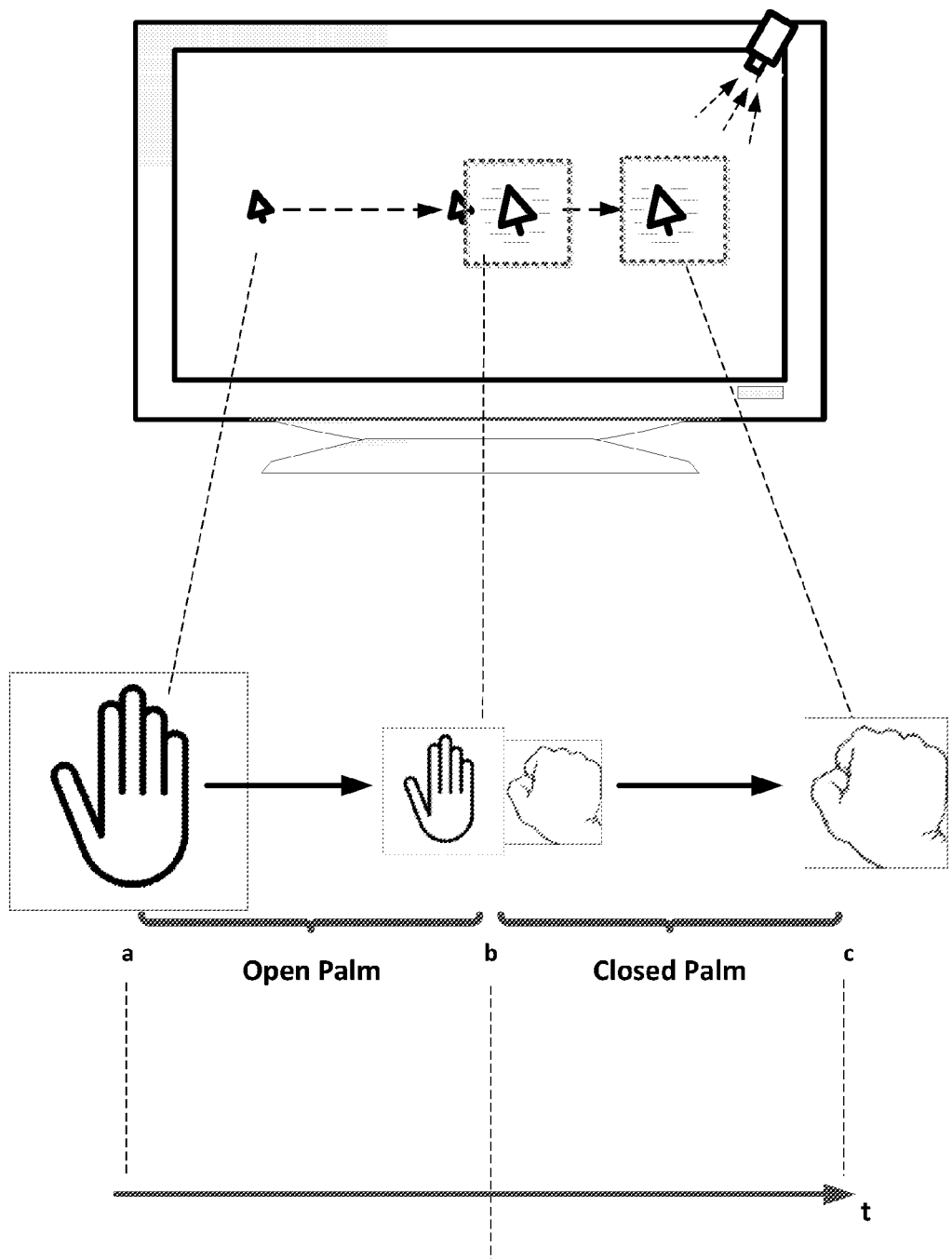
FIG. 8B is an illustration depicting use of an exemplary TLHMI coupled to a screen of a computing platform, wherein mode transitioning is triggered by a closing into a first of a user's hand, and the mode transition results in a framing and magnification of a screen element and the area around it.

Turning now to FIG. 8B there is shown, in accordance with some embodiments of the present invention, an exemplary operation configuration of a computing platform functionally associated with a Touchless Human Machine Interface (TLHMI) module, wherein a change in the configuration of a user's limb or organ may trigger an operation mode transition and as a result a screen element augmentation. The user's hand may initially travel, from point a to point b, with its palm open, causing the screen cursor to travel from point a' to point b'. As the hand's palm closes (around point b) a 'magnifying glass' type augmentation around the screen cursor's location may appear within a frame on the screen, such that a certain area around the cursor may be zoomed in on and framed as long as the hand's palm remains closed. Once the hand's palm reopens, the 'magnifying glass' augmentation and frame may disappear and the screen cursor, and its surrounding area, may return to their regular shape, size and view.

Figure 8C:
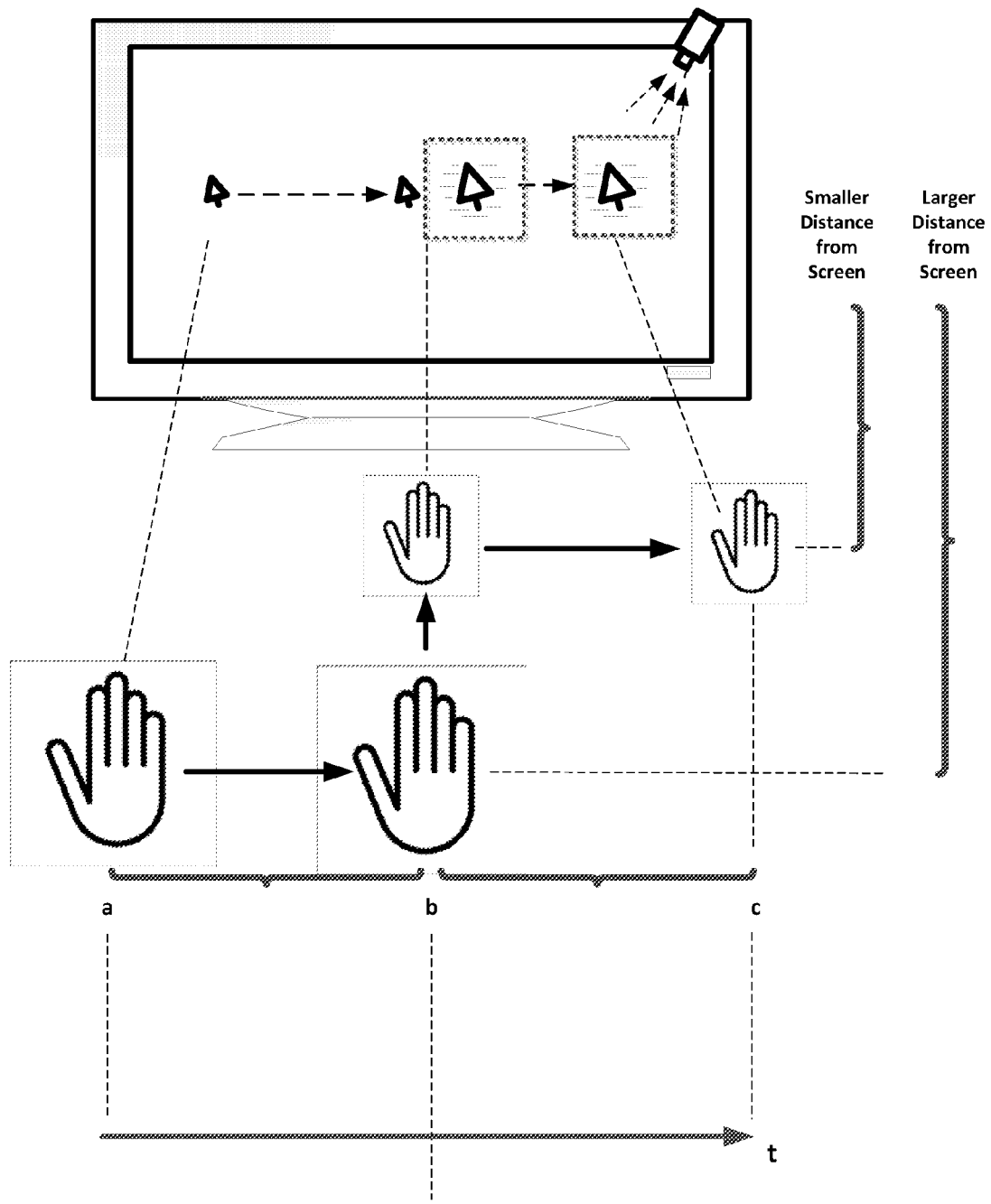
FIG. 8C is an illustration depicting use of an exemplary TLHMI coupled to a screen of a computing platform, wherein mode transitioning is triggered by moving a user's hand closer to the screen, and the mode transition results in a framing and magnification of a screen element and the area around it.

Turning now to FIG. 8C there is shown, in accordance with some embodiments of the present invention, an exemplary operation configuration of a computing platform functionally associated with a Touchless Human Machine Interface (TL-HMI) module, wherein a change in the position of a user's limb or organ may trigger an operation mode transition and as a result a screen element augmentation. The user's hand may initially travel, from point a to point b, at a first distance from the screen or the touchless sensor (e.g. camera), causing the screen cursor to travel from point a to point b. As the hand decreases its distance from the screen or the touchless sensor (around point b) to a second distance smaller than the first distance, a 'magnifying glass' type augmentation around the screen cursor's location may appear within a frame on the screen, such that a certain area around the cursor may be zoomed in on and framed as long as the hand remains at a distance equal or smaller than the second distance. Once the hand increases its distance back to, or beyond, the first distance, the 'magnifying glass' augmentation and frame may disappear and the screen cursor, and its surrounding area, may return to their regular shape, size and view.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A multimode touchless human machine interface (TLHMI) comprising:
   one or more touchless sensors to sense a position or a movement of a subject portion within a sensing zone of said one or more sensors;
   a tracking engine to receive an output of said one or more sensors and to: (a) track a movement of a portion of a computing platform user within the sensing zone to determine a gesture being performed by the portion of a computing platform user, within the sensing zone, and (b) determine one or more parameters of tracked movements of the portions of the user within the sensing zone;
   a mode transition module configured to monitor the determined one or more parameters of the motion, identify one or more mode transitioning parameters within the determined one or more parameters and determine a mode of operation of the TLHMI, based on the identified mode transitioning parameters; and
   a user input generator to convert an output of said tracking engine indicating the determined gesture into signals indicative of a user input and to provide said user input signals to a functionally associated computing platform, wherein said generator is adapted to generate: (1) a first output signal in response to a given determined gesture while the TLHMI is operating in a first mode of operation, and (2) a second output signal, which second output signal is a modification of the first output signal, in response to the same given determined gesture while the TLHMI is operating in a second mode of operation;
   wherein the modification of the first output signal is a modification of a ratio between the tracked movement and a movement of a control element of the computer platform associated with the input signals.

2. The multimode touchless human machine interface (TLHMI) according to claim 1, wherein said one or more sensors are image sensors.

3. The multimode touchless human machine interface (TLHMI) according to claim 1, wherein said one or more mode transitioning parameters is a parameter selected from the group consisting of: tracked movement speed, tracked movement direction, tracked movement gesture, orientation of tracked user portion, and configuration of tracked user portion.

4. The multimode touchless human machine interface (TLHMI) according to claim 1, wherein said mode transition module is further adapted to cause said TLHMI to transition into the determined mode of operation.

5. The multimode touchless human machine interface (TLHMI) according to claim 4, wherein the determined gesture is a hand movement of a given distance, and the first output signal responsive to the determined gesture is a pointer movement signal intended to cause a screen pointer to be displaced by a first displacement value.

6. The multimode touchless human machine interface (TLHMI) according to claim 5, wherein the second output signal responsive to the determined gesture is a pointer movement signal intended to cause a screen pointer to be displaced by a second displacement value different from the first displacement value.

7. The multimode touchless human machine interface (TLHMI) according to claim 6, further comprising a detected motion to screen element deviation mapper storing different movement to deviation ratio values for each of two or more modes of said TLHMI.

8. The multimode touchless human machine interface (TLHMI) according to claim 1, further comprising Display Augmentation Logic to alter a rendering aspect of one or more screen elements in response to said TLHMI transitioning into one or more of a set of possible modes.

9. The multimode touchless human machine interface (TLHMI) according to claim 8, wherein said Display Augmentation Logic is adapted to either enlarge or frame a screen region around a user interface element upon said TLHMI entering a given mode.

10. A computing device comprising:
   a screen;
   a multimode touchless human machine interface (TLHMI) comprising: (1) one or more touchless sensors to sense a position or a movement of a subject portion within a sensing zone of said one or more sensors; (2) a tracking engine to receive an output of said one or more sensors and to: (a) track a movement of a portion of a computing platform user portion within the sensing zone to determine a gesture being performed by the portion of a computing platform user within the sensing zone, and (b) determine one or more parameters of tracked movements of the portions of the user within the sensing zone; (3) a mode transition module configured to monitor the determined one or more parameters of the motion, identify one or more mode transitioning parameters within the determined one or more parameters and determine a mode of operation of the TLHMI, based on the identified mode transitioning parameters; and (4) a user input generator to convert an output of said tracking engine indicating the determined gesture into signals indicative of a user input, wherein said generator is adapted to generate: (a) a first output signal in response to a given determined gesture while the TLHMI is operating in a first mode of operation, and (b) a second output signal, which second output signal is a modification of the first output signal, in response to the same given determined gesture while the TLHMI is operating in a second mode of operation;
   wherein the modification of the first output signal is a modification of a ratio between the tracked movement and a movement of a control element of the computer platform associated with the input signals.

11. The device according to claim 10, wherein said one or more sensors are image sensors.

12. The device according to claim 10, wherein said one or more mode transitioning parameters is a parameter selected from the group consisting of: tracked movement speed, tracked movement direction, tracked movement gesture, orientation of tracked user portion, and configuration of tracked user portion.

13. The device according to claim 10, wherein said mode transition module is further adapted to cause said TLHMI to transition into the determined mode of operation.

14. The device according to claim 13, wherein the determined gesture is a hand movement of a given distance, and the first output signal responsive to the determined gesture is a pointer movement signal intended to cause a screen pointer to be displaced by a first displacement value.

15. The device according to claim 14, wherein the second output signal responsive to the determined gesture is a pointer movement signal intended to cause a screen pointer to be displaced by a second displacement value different from the first displacement value.

16. The device according to claim 15, further comprising a detected motion to screen element deviation mapper storing different movement to deviation ratio values for each of two or more modes of said TLHMI.

17. The device according to claim 10, further comprising Display Augmentation Logic to alter a rendering aspect of one or more screen elements in response to said TLHMI transitioning into one or more of a set of possible modes.

18. The device according to claim 17, wherein said Display Augmentation Logic is adapted to either enlarge or frame a screen region around a user interface element upon said TLHMI entering a given mode.

* * * * *